May 8, 1928.
C. M. CHAPMAN
1,669,388
MEANS FOR ATTACHING BLADES TO HANDLES
Filed Jan. 21, 1926
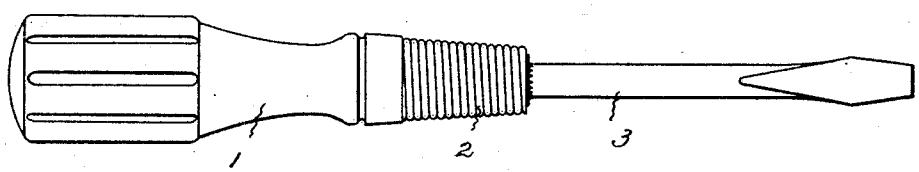
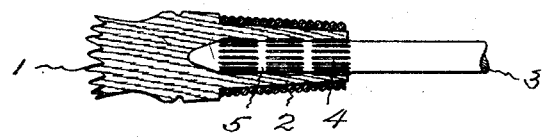
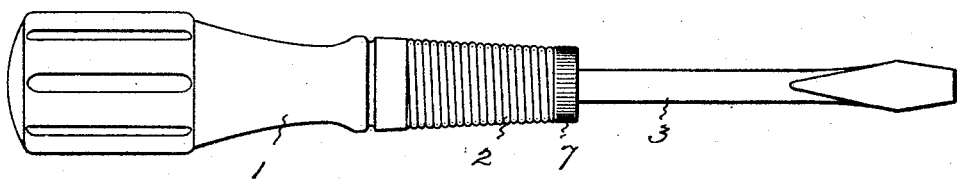
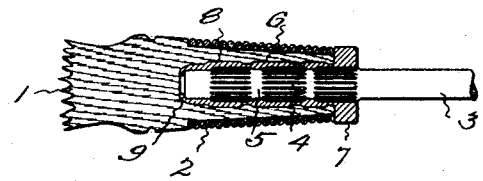
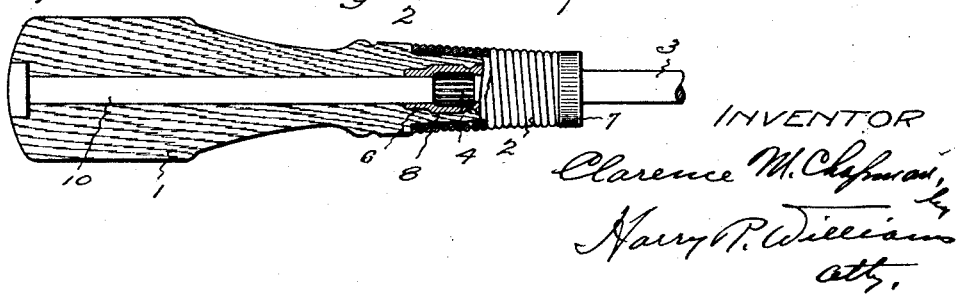
INVENTOR
Clarence M. Chapman,
Harry P. Williams
atty.

Patented May 8, 1928.

1,669,388

UNITED STATES PATENT OFFICE.

CLARENCE M. CHAPMAN, OF TERRYVILLE, CONNECTICUT, ASSIGNOR TO THE CHAPMAN MACHINE COMPANY, OF TERRYVILLE, CONNECTICUT, A CORPORATION OF CONNECTICUT.

MEANS FOR ATTACHING BLADES TO HANDLES.

Application filed January 21, 1926. Serial No. 82,741.

This invention relates to means employed for attaching blades to handles, and while especially adapted for securing screw driver blades in handles so as to prevent them from turning when in use, or dropping out after long use, is useful for securing blades of other tools, such as ice picks, chisels, gouges and the like, to their handles.

The object of the invention is to provide a simple and cheap means for this purpose which will permit of an easy assembling of the blade and handle without danger of splitting the handle and will always exert powerful hold regardless of any shrinking or expanding of the handle under atmospheric changes.

In attaining this object the end of the handle, which is ordinarily made of wood, is provided with a wound wire ferrule that tightly binds the end of the handle but expands and contracts under variations in the diameter of the end of the handle, and the end of the shank of the blade is formed with a plurality of longitudinally extending teeth, desirably made by knurling. These teeth when the shank is driven into the end of the handle or driven into a sleeve with similar knurling, cut key-ways and embed themselves so as to form keys that will prevent the shank from turning when in use, and the expansion ferrule stretches and contracts so that the handle will conform to the blade shank without splitting and tightly bind to the shank that is thus keyed in place.

In the accompanying drawings Fig 1 shows a side view of a screw driver with a blade directly attached to the handle according to this invention. Fig. 2 is a section of the end of the handle and blade shank. Fig. 3 is a side view of a screw driver with a blade secured to the handle through the medium of a sleeve. Fig. 4 is a section showing the end of the handle, sleeve and tool shank illustrated in Fig. 3. Fig. 5 is a section of the handle provided with a drive rod back of the tool shank, as is sometimes used.

The handle 1 is ordinarily turned from wood but may be made of composition, to any approved or conventional shape. Driven tightly upon the small tapered end of the handle is a ferrule 2 made of a coil of spring metal wire.

The shank 3 of the tool blade is provided with longitudinally extending teeth 4. These teeth are preferably formed in a screw machine by a knurling tool in such manner that annular grooves 5 are left between series of teeth. The end of the shank may be tapered as shown in Fig. 2 or left more blunt as illustrated in Fig. 4.

In the form first shown the knurled end of the tool shank is driven directly into a hole in the handle within the expansion ferrule. In this case the teeth of the shank cut into the wall of the hole and form keys which prevent the shank from turning. The ferrule stretches sufficiently to permit the shank to be driven into the hole without danger of splitting the handle and binds with such force that the wood is contracted into the grooves between the knurled teeth so as to prevent any longitudinal movement of the tool in the hole. The ferrule expands and contracts as the handle swells and shrinks under temperature and humidity changes and thus always binds the handle tightly upon the toothed shank and prevents any turning or dropping out of the tool blade.

In the second form illustrated the shank of the tool provided with knurled teeth as above described is driven into a hole made through a sleeve 6 that has an enlarged head 7. In this case the metal of the sleeve may, if desired, be slightly softer than the metal of the tool shank so that the teeth of the shank will cut into the wall of the hole in the sleeve and thus prevent the shank from turning in the sleeve. The exterior of this sleeve is provided with teeth 8 similar to the teeth on the tool shank and when the sleeve is driven into the hole in the handle these teeth form keys that prevent the parts from turning and loosening so that they will be inoperative. In this case the end 9 of the sleeve may be closed over the inner end of the shank so as to prevent the shank from being driven through the sleeve into the handle when the handle is subjected to blows, as it frequently is when the tool is used for some purposes. The enlarged head of the sleeve abutting against the end of the handle and the ferrule prevents the sleeve from being driven into the handle beyond its proper position under blows, and eliminates danger of splitting the handle when hammered. A headed rod 10 may be inserted into the handle so as to abut against the end of the tool shank in the common manner, for the purpose of sustaining the blows of a hammer on the end of the handle.

The fastening means described may be rapidly and cheaply produced on a screw machine and the parts easily assembled without danger of splitting the handle. The tool shank thus attached will not loosen and cannot be turned in the handle nor will it drop from the handle as the expansion ferrule remains tight under all conditions, even after long use.

The invention claimed is:

1. Means for attaching a tool to a handle which comprises a coiled wire ferrule, fitted on and free to expand and contract on the end of the handle, a sleeve provided with a plurality of longitudinally extending teeth separated by annular grooves driven into the end of the handle and located in and subject to the compression of said ferrule and a tool shank provided with a plurality of longitudinally extending teeth separated by annular grooves driven into said sleeve.

2. Means for attaching a tool to a handle which comprises a coiled wire ferrule, fitted on and free to expand and contract on the end of the handle, a sleeve provided with a plurality of longitudinally extending teeth driven into the end of the handle and located in said ferrule, said sleeve having a flange on its outer end which engages the end of the handle and forms an abutment for one end of said ferrule, and a tool shank provided with a plurality of longitudinally extending teeth driven into said sleeve.

3. Means for attaching a tool to a handle which comprises a coiled wire ferrule expansible and contractible on the end of the handle, a sleeve provided with a plurality of longitudinally extending teeth driven into the ferrule end of the handle, a tool shank provided with a plurality of longitudinally extending teeth driven into the sleeve, and a drive rod embedded in the handle and extending from the outer end of the handle into said sleeve and butting against the end of the tool shank.

CLARENCE M. CHAPMAN.